(12) United States Patent
Schofield et al.

(10) Patent No.: US 7,866,019 B1
(45) Date of Patent: Jan. 11, 2011

(54) METHOD OF MAKING SIMULATED LANDSCAPING ROCKS AND EDGING BLOCKS FROM EXPENDED PLASTIC BOTTLES

(76) Inventors: John Paul Schofield, 1847 Terrence Dr., Stafford, TX (US) 77477; Janet Ellen Schofield, 1847 Terrence Dr., Stafford, TX (US) 77477

(*) Notice: Subject to any disclaimer, the term of this patent is extended or adjusted under 35 U.S.C. 154(b) by 293 days.

(21) Appl. No.: 12/231,185

(22) Filed: Aug. 30, 2008

Related U.S. Application Data

(60) Provisional application No. 60/993,360, filed on Sep. 13, 2007.

(51) Int. Cl.
*B21K 21/16* (2006.01)

(52) U.S. Cl. ............... 29/401.1; 264/36.15; 264/36.18; 264/36.19; 264/915; 264/918; 427/403; 427/407.1

(58) Field of Classification Search ............... 29/401.1; 264/36.15, 36.18, 36.19, 915, 918; 427/403, 427/407.1
See application file for complete search history.

(56) References Cited

U.S. PATENT DOCUMENTS

| | | | |
|---|---|---|---|
| 1,746,869 A | 2/1930 | Rosenthal | |
| 3,038,512 A * | 6/1962 | Staton | 220/660 |
| 3,100,576 A | 8/1963 | Frank | |
| 3,762,113 A | 10/1973 | O'Mullian et al. | |
| 3,836,619 A * | 9/1974 | Volent | 64/131 |
| 3,857,215 A | 12/1974 | Moore | |
| 4,043,826 A | 8/1977 | Hum | |
| 4,197,684 A | 4/1980 | Johnson | |
| 4,258,522 A | 3/1981 | Amaral | |
| 4,369,598 A * | 1/1983 | Beckwith | 47/61 |
| 4,599,131 A * | 7/1986 | Matuszak | 156/584 |
| 4,678,617 A * | 7/1987 | Sykes | 264/458 |
| 4,734,302 A * | 3/1988 | Baskin | 428/15 |
| 4,797,237 A * | 1/1989 | Hammer et al. | 264/45.3 |
| 4,880,580 A * | 11/1989 | Bowers et al. | 264/486 |
| 4,884,328 A * | 12/1989 | Neighbors | 29/401.1 |
| 4,956,033 A * | 9/1990 | Martin et al. | 156/94 |
| 5,102,326 A * | 4/1992 | Bacher et al. | 425/202 |
| 5,123,993 A * | 6/1992 | Wiggins | 156/584 |
| 5,133,124 A * | 7/1992 | Burroughs | 29/403.1 |
| 5,214,897 A | 6/1993 | Nordberg | |
| 5,225,130 A * | 7/1993 | Deiringer | 264/102 |
| 5,225,137 A * | 7/1993 | Sadr | 264/349 |
| 5,236,603 A * | 8/1993 | Sampson | 210/770 |
| 5,314,067 A | 5/1994 | Strock | |
| 5,372,676 A * | 12/1994 | Lowe | 216/30 |
| 5,482,216 A * | 1/1996 | Hess | 241/23 |
| 5,490,362 A | 2/1996 | Mercier | |
| 5,543,100 A * | 8/1996 | Kluh et al. | 264/130 |
| 5,588,196 A * | 12/1996 | Samelson | 29/401.1 |
| 5,615,529 A | 4/1997 | Johnson et al. | |
| 5,636,890 A * | 6/1997 | Cooper | 296/37.1 |
| 5,683,170 A | 11/1997 | Blaha | |
| 5,746,037 A * | 5/1998 | Nordberg | 52/405.1 |

(Continued)

*Primary Examiner*—Rick K Chang

(57) ABSTRACT

A method for converting expended plastic water bottles and other plastic beverage bottles into artificial landscape rocks and edging blocks by cutting a flap in an empty plastic bottle, filling the bottle with empty, crushed food cans, or compacted, expended plastic bottles, sealing the flap with wire lath and screws, wrapping the bottle with mason lath or chicken wire, or coating the bottle with a bonding agent, applying a stucco coating to the bottle, brushing the wet stucco, and coloring the stucco with a pigmenting agent.

4 Claims, 2 Drawing Sheets

U.S. PATENT DOCUMENTS

| | | | |
|---|---|---|---|
| 5,815,903 A * | 10/1998 | Foster et al. | 29/401.1 |
| 5,817,162 A * | 10/1998 | Penrith | 65/112 |
| 5,826,373 A | 10/1998 | Mrdjenovich | |
| 5,911,927 A | 6/1999 | Roberts | |
| 6,033,744 A | 3/2000 | Bright | |
| 6,132,820 A * | 10/2000 | Callahan | 428/15 |
| 6,248,411 B1 | 6/2001 | Warfel | |
| 6,623,813 B2 * | 9/2003 | Hsu | 428/15 |
| 6,898,908 B2 * | 5/2005 | Messenger et al. | 52/268 |
| 7,115,178 B1 * | 10/2006 | Schofield et al. | 156/94 |
| 7,186,366 B2 * | 3/2007 | Schwinn | 264/509 |
| 7,648,747 B2 * | 1/2010 | Straka et al. | 428/34.4 |
| 7,707,784 B2 * | 5/2010 | Korman et al. | 52/79.2 |
| 7,736,703 B1 * | 6/2010 | Schofield et al. | 427/403 |

* cited by examiner

STEP 1: REMOVE THE LABEL FROM THE BOTTLE AND CUT A FLAP ON THE SIDE OF THE BOTTLE.

STEP 2: FILL THE BOTTLE WITH CLEANED, CRUSHED, EXPENDED METAL FOOD CANS OR COMPACTED, SMALL, PLASTIC BOTTLES.

STEP 3: SEAL THE FLAP USING A SMALL PIECE OF WIRE LATH AND SCREWS TO HOLD THE FLAP CLOSED.

STEP 4: WRAP THE BOTTLE WITH MASON LATH OR WRAP THE BOTTLE WITH CHICKEN WIRE, OR COAT THE BOTTLE WITH A BONDING AGENT

STEP 5: COVER THE BOTTLE COMPLETELY WITH STUCCO.

STEP 6: BRUSH THE STUCCO TO DESIRED FINISH.

STEP 7: APPLY CONCRETE STAIN TO THE STUCCO.

FIG 5

METHOD OF MAKING SIMULATED LANDSCAPING ROCKS AND EDGING BLOCKS FROM EXPENDED PLASTIC BOTTLES

CROSS-REFERENCE TO RELATED APPLICATIONS

This application claims the benefit of provisional patent application Ser. No. 60/993,360, filed Sep. 13, 2007 by the present inventors.

FEDERALLY SPONSORED RESEARCH

Not Applicable

SEQUENCE LISTING OR PROGRAM

Not Applicable

BACKGROUND OF THE INVENTION

1. Field of the Invention

This invention generally relates to a method of making landscape rocks and landscape edging blocks, specifically from expended, plastic water bottles and other expended, plastic beverage bottles.

2. Prior Art

One of the serious problems confronting society today is the generation of waste. Landfilling is the primary method of waste disposal, but it appears that landfills throughout the world are rapidly filling up. Discarded plastic containers are non-biodegradable, and so add to the landfill and environmental problem.

The present invention enables the conversion of these non-biodegradable items into useful and decorative articles, specifically landscape rocks and edging blocks, thus keeping these plastic containers out of the landfill. In addition, the landscaping rock or edging block produced by this invention can be filled with non-organic trash, such as empty cans, thus further helping to alleviate the waste disposal, environmental problem.

Also, in the modern world, landscaping has become very important, because it adds to the aesthetic quality of property. Commensurate with the increased emphasis on landscaping has been the need for edging and border structure, and decorative border rocks. The present invention closely simulates masonry materials in color, texture, and appearance, and is economical and easy to install. Because the rock of the invention is made primarily of waste product materials, it serves the dual purpose of helping the environment and adding to the aesthetic quality of a property.

Prior art discloses various attempts to recycle used materials and to produce border blocks and landscape rocks from different materials such as steel, aluminum, plastic or concrete.

U.S. Pat. No. 7,115,178 B1 (2006), to Schofield, (the present inventors), proposes a process to convert empty, plastic bottles into rocks by using heat to make the bottles malleable and actual rocks to shape the bottles into rock-like shapes. The present invention does not need actual rocks and provides even more recycling possibilities, because the empty, plastic bottle of the invention is filled with empty, used cans, or empty, compacted, plastic bottles.

U.S. Pat. No. 5,020,175 (1991), to Kirkpatrick proposes to use expended, plastic, beverage bottles to form cushions, which could be used for various purposes. It addresses recycling, but not landscaping.

U.S. Pat. No. 5,214,897 (1993), to Nordberg proposes a concrete building block encapsulating a compacted bundle of tires as a building block and as a permanent, environmentally safe container for used automobile tires. This addresses recycling and masonry, but not landscaping.

U.S. Pat. No. 6,623,813 (2003), to Hsu proposes a hollow, artificial stone. This stone is made using stone powder, adhesive and a mold. The present invention requires no mold because the plastic container is the mold. Also, the Hsu invention does not address recycling.

U.S. Pat. No. 4,043,826 (1977), to Hum proposes a lightweight, cement rock colored with cement dyes or pigments. This uses a mold which has to be made first. The present invention used the actual empty, plastic container as the mold. Again, the Hum invention does not address recycling.

U.S. Pat. No. 6,132,820 (2000), to Callahan shows a rock made of cement and polystyrene poured into a mold. Again a mold must be prepared first. The polystyrene used is a waste product, but comprises only a small portion of the rock, so the rock materials are not primarily recycled.

OBJECTS AND ADVANTAGES

Accordingly, several objects and advantages of our invention are to convert empty, plastic bottles into landscaping edging blocks and landscaping rocks that look natural, are inexpensive and easy to install, and are lighter than real rocks or masonry edging blocks.

Another object is to do a great service to the environment by providing for the recycling of previously wasted, non-biodegradable, plastic bottles and expended food cans that take up limited landfill space.

A further object is to make the landscape and edging rocks natural looking and aesthetically pleasing, so they can be used to enhance any landscape.

The different sized bottles used in this invention can be used for different purposes in landscaping.

For example, the two and a half gallon water bottle size can be used for curbstones or edging blocks. The landscape edging block of this present invention can be easily installed by digging a trench, pouring concrete in the trench, laying the block, handle side down into the concrete, allowing the concrete to dry, and putting mortar between the blocks, just like regular masonry or edging blocks are installed. Once the concrete has dried, and the mortar set, the blocks are firmly in place and will not shift. The trench could also be strengthened with rebar, and the concrete poured around the rebar.

The one-gallon and five-gallon sized bottles can be used for many purposes, including but not limited to; garden or lawn rocks, or garden or lawn edging.

A hole can be drilled in a large landscaping rock, and a solar light can be installed in the rock by placing the solar light stem into the hole and calking around the stem.

Further objects and advantages will become apparent from a consideration of the ensuing description and drawings.

SUMMARY

The present invention pertains to a process for converting expended thermoplastic containers, specifically plastic water bottles and other plastic beverage bottles into landscaping blocks and border blocks.

According to the invention, the plastic bottle is prepared by removing the label and cutting a flap into a side of the bottle. The bottle is then filled with cleaned, crushed, expended, food cans or compacted, small, expended, plastic beverage bottles. The flap is then sealed using a small piece of wire lath and screws to hold the flap closed. The bottle so stuffed is then either wrapped with mason lath, or wrapped with chicken wire, or coated with a bonding agent, depending on the size and configuration of the bottle. Stucco is then applied by trowel or spray and brushed to a desired finish. The stucco may be colored with a pigmenting agent if desired.

The rocks thus produced may be placed in a stand alone mode on the landscape or may be installed as a landscape edging by being set in a concrete-filled trench and having mortar put in between the rocks to fix them permanently in place.

BRIEF DESCRIPTION OF THE DRAWINGS

FIG. 5 is a flow chart showing in a general way the steps of the method of producing artificial landscaping rocks.

DETAILED DESCRIPTION ACCORDING TO THE PREFERRED EMBODIMENTS OF THE PRESENT INVENTION

Figure 1:
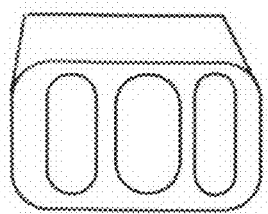
FIG. 1 shows a plastic bottle with the label removed.

FIG. 1 shows a two-and-a-half gallon, plastic, water bottle with the label removed. Plastic bottles of various sizes, including but not limited to, one gallon, three gallon, and five gallon, can also be used.

Figure 2:
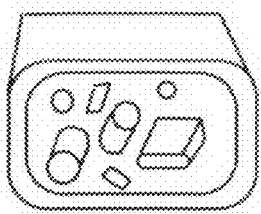
FIG. 2 shows the plastic bottle with a flap cut in the side, said bottle filled with cans.

FIG. 2 shows the plastic bottle of FIG. 1 with a flap cut in the side. In this embodiment the bottle has been filled with expended, crushed food cans. The bottle can also be filled with compacted, plastic bottles, not shown in this figure.

Figure 3:
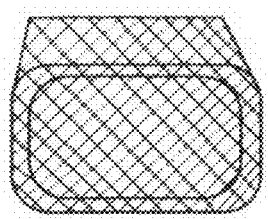
FIG. 3 shows the plastic bottle covered with mason lath.

FIG. 3 shows the bottle of FIG. 2 covered with mason lath. The bottle can also be covered with chicken wire or a bonding agent not shown in this figure.

Figure 4:
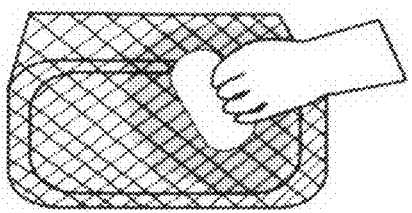
FIG. 4 shows the plastic bottle being coated with stucco.

FIG. 4 shows the bottle of FIG. 3 being covered with stucco by troweling. The stucco can also be sprayed on.

FIG. 5 shows the steps of the method of producing the artificial plastic rock.

Step 1. To prepare the plastic bottle for processing remove the label from the bottle and cut a flap on the side of the bottle.

Step 2. Fill the bottle from Step 1 with cleaned, crushed, expended food cans or compacted plastic bottles.

Step 3. Seal the flap using a small piece of wire lath and screws to hold said flap closed.

Step 4. Wrap the bottle with mason lath or chicken wire, or coat the bottle completely with a bonding agent. The bonding agent can be any agent that bonds stucco to plastic.

Step 5. Cover the bottle of Step 4 completely with stucco that is troweled or sprayed on.

Step 6. Brush the wet stucco of Step 5 to a desired rock-like finish.

Step 7. Apply concrete stain to the dry, stucco finish of Step 6.

It is to be understood that the present invention is not limited to the embodiments described above. Since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A method of converting an expended thermoplastic container into a simulated rock, the method comprising the steps of:
    (a) cutting a flap in a side of the said container,
    (b) filling the container with non-organic waste materials,
    (c) closing the flap by means of wire lath and screws,
    (d) preparing the container for wet stucco by selecting from the group consisting of wrapping the container with mason lath, wrapping the container with chicken wire, or coating the container with a bonding agent,
    (e) covering the container with the stucco to give the container a rock-like appearance,
    (f) brushing the wet stucco,
    (g) applying a concrete stain to the stucco.

2. The method as claimed in claim 1, wherein the non-organic waste materials are selected from the group consisting of crushed, expended metal food cans or compacted, plastic bottles.

3. The method as claimed in claim 1, further comprising mixing a coloring pigment into a wet stucco mix.

4. The method as claimed in claim 1, wherein the rock is adapted to provide at least one selected from the group consisting of a landscaping rock, a curbstone, a landscape edging block.

\* \* \* \* \*